Oct. 16, 1956   J. ROCKOFF   2,766,800
NON-SKID RUBBER PRODUCT
Filed Jan. 5, 1953

INVENTOR.
JOSEPH ROCKOFF
BY
ATT'Y.

United States Patent Office 2,766,800
Patented Oct. 16, 1956

2,766,800

NON-SKID RUBBER PRODUCT

Joseph Rockoff, Dayton, Ohio, assignor to The Dayton Rubber Company, a corporation of Ohio Application January 5, 1953, Serial No. 329,619

3 Claims. (Cl. 152—211)

The present invention relates to improved non-skid rubber articles, particularly automotive tires and the like.

In an attempt to improve the skid-resistant properties of rubber articles, such as automotive tires and the like, the admixture of many different substances with the rubber-like composition of the article has been proposed. These proposed added ingredients may be generally classified in two basic groups; namely, those which upon being exposed by wear on the article to the wearing surface thereof, are intended to be so worn away as to leave a small crater or recess, forming a skid-resistant suction-like cup on the wearing surface, and those which upon being exposed to the wearing surface of the tire are intended to provide an abrasive effect so as to increase the coefficient of friction of the wearing surface thereby preventing its skidding tendencies on surfaces such as wet or icy highways and the like. Typical ingredients within the first of the above-mentioned classifications have heretofore included salt, wood or similar cellulosic particles such as sawdust and the like; and those within the second group have included metal filings, Carborundum, emery dust, pulverized magnesite and the like.

Those materials which are used to form the skid-resistant "suction cup" craters on the wearing surface have proved generally unsatisfactory in that, before the particles separate from the rubber article, they have been so worn by the wearing forces acting on the wearable surface of the article that the crater left upon their separation is so small as to have little or no effect on the skid-resistant properties of the article. Furthermore, during the time that these particles are being worn to the point that they will separate from the rubber article, the smooth surfaces formed on the particles themselves serve to lower the overall coefficient of friction of the surface of the rubber article so that its skid-resistant properties are seriously diminished. On the other hand, the ingredients that have heretofore been added to rubber-like articles for the purpose of creating an abrasive friction-resistant effect at the wearable surfaces, have been unsatisfactory in that the harshness of the abrasive material has damaged the rubber composition within the tire or similar article, even before such abrasive material is exposed to the wearable surface and can do the work for which it has been intended.

An additional disadvantage of the previously proposed methods of increasing the skid-resistant properties of the rubber article is that the particular ingredients employed have affected the skid-resistant properties of the article only according to the method of the one of the above-mentioned classifications to which it belongs. For example, the addition of particles of wood to the rubber composition of the article might provide for the creation of the small "suction cup" craters in the wearable surface of the article, but at the same time, these wood particles would have no abrasive effect and, indeed, because of the lower coefficient of friction of wood as compared to that of the rubber, would actually reduce the coefficient of friction of the overall article, thereby subtracting from its skid-resistant properties, at least until the wood particle was sufficiently worn to fall away from the article leaving the crater.

It is accordingly an object of the present invention to provide a non-skid rubber article, the properties of which will depend upon all of the known methods of improving skid-resistance.

That is to say it is an object of the present invention to provide a rubber-like article which, as it is worn away, will have about its wearable surface a plurality of suction creating craters as well as abrasive matter.

It is a further object of the present invention to provide a non-skid rubber article having about its wearable surface a plurality of suction creating cavities, the interior dimensions of which are greater than the dimensions of the opening thereof such that the orifice of said opening will be surrounded by a highly resilient rim of rubber-like composition which will facilitate the formation of an airtight seal between the wearable surface of the rubber article and the highway or similar surface with which it is in contact.

It is still a further object of the present invention to provide a non-skid vehicular tire having a tread portion the road-contacting surface of which will present a changing pattern of small suction creating craters and abrasive particle fragments, while that portion of the tread not exposed to the road-contacting surface will suffer no deleterious effects from ingredients contained within said tread portion.

The non-skid rubber article according to the present invention will comprise a wearable surface-contacting portion of rubber or rubber-like composition interspersed with which are a plurality of small, hollow frangible particles. Said hollow frangible particles may be distributed in any proportion throughout the rubber-like composition, depending upon the degree of anti-skid properties desired in the final article; and they may be concentrated near the wearable surface-contacting portion of the article or evenly distributed throughout the same, depending upon the anticipated wear. In the conventional balloon type automotive tire for example, it is entirely satisfactory to have the hollow frangible particles evenly distributed throughout that portion of the tire commonly referred to as the tread.

The hollow frangible particles to be incorporated within the article of the present invention are preferably smooth surfaced and of such size and structure that, while they are embedded in the rubber composition, they will resist the forces acting therein and will accordingly remain whole and unbroken until they are exposed at the surface-contacting portion of the aritcle at which time they will be easily broken. Particles such as these, because of their smooth surface, will have no abrasive, wearing, or deteriorating effect upon the rubber composition while the particle remains completely embedded therein; whereas, upon being exposed to the surface-contacting portion of the article, the hollow frangible ingredient will be broken to provide an abrasive action between the surface-contacting portion of the rubber article and the highway or similar surface with which it is in contact. The fragments resulting from this initial fracturing of the frangible particle will themselves form an abrasive between the rubber article and the surface with which it is in contact, but more important, the portion of the fractured particle remaining within the tire will present a sharp toothed portion to the wearing surface thereof, thereby increasing its coefficient of friction. At a later interval in the diminution of the rubber article resulting from wear upon the surface-contacting portions thereof, the portion of the broken particle yet remaining embedded in the rubber will be further broken into fine particles such as will escape from the rubber material leaving the previously mentioned desired suction forming cavity.

It has been found that particles particularly adaptable to the present invention are composed of a refractory composition such as fused argillaceous or siliceous materials. Such materials in the form of small spheroidal or similar smooth-surfaced shapes have been found especially satisfactory for the purposes of the present invention in that they are sufficiently hard and durable to resist breakage while remaining within the rubber-like material but, at the same time, are sufficiently brittle to fracture upon exposure to the article's wearing surface enhancing its skid-resistant properties. Spherical, spheroidal or similar rounded shape particles are best suited for the present invention in that even though they are broken into abrasive fragments upon being exposed to the surface of the article, they still present a smooth, regular-surface contour toward the rubber-like composition so that the abrasive effect of the particle is confined to its surface-exposed portion and no abrasive damage results to the rubber-like material. The spheroidal particles referred to herein and which are incorporated as a component of the rubber compounds referred to, are obtained by the fusion or argillaceous materials such as clays and shales, under such conditions that finely divided, hollow spheroidal or substantially spherical particles are obtained. These particles are obtained by feeding the ground and screened clay into the top of a vertical furnace. The individual grains of the raw material fall through a gas-air flame, become fused, and cool during the remainder of their fall. They are then collected at the bottom of the furnace. The resulting particles are smooth, hollow and almost spherical and possess sufficient strength to permit compounding with rubber by milling or otherwise without breaking. These particles may range in size from about 0.20 in. in diameter down to about 0.001 in. in diameter. The particular objects, advantages, and features of the present invention will be more clearly described in the following detailed disclosure in connection with which reference may be had to the appended drawings:

Figure 1:
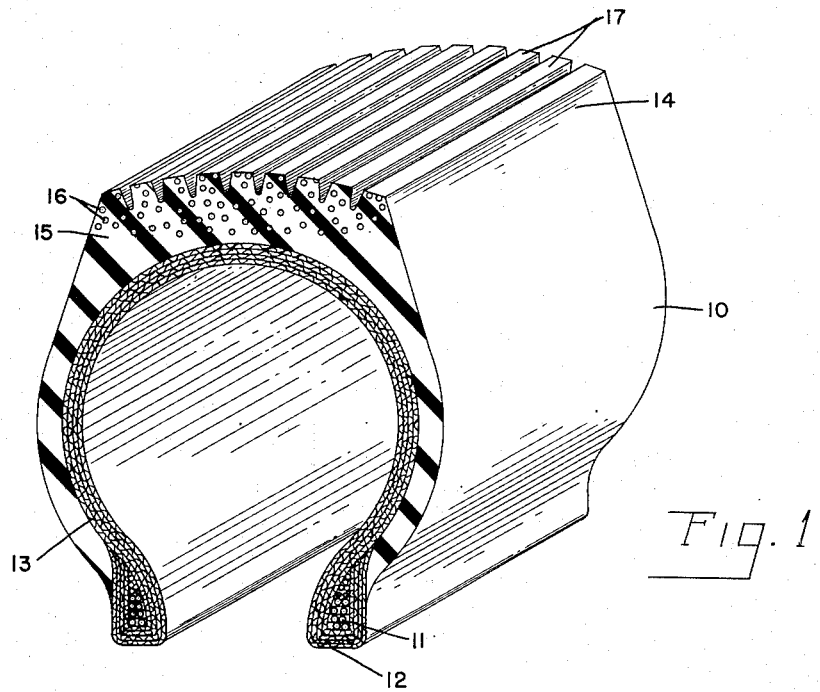
Figure 1 is a perspective view in partial vertical cross section of a typical pneumatic vehicular tire incorporating the features of the present invention.

Referring now to Figure 1 and a typical embodiment of the present invention, there is shown a tire casing 10 which comprises a metallic cable or stranded wire bead reinforcement 11 near the rim contacting portion 12 of said casing, a rubberized fabric reinforced carcass portion 13 and a wearable road-contacting tread portion 14 composed of the conventional rubber or rubber-like composition 15 interspersed with which are small, hollow frangible particles 16 in accordance with the present invention. The wearable or surface-contacting portion of the pneumatic tire is along that surface upon which is formed the tread design which is shown in the illustration of Figure 1 to consist of parallel longitudinal ribs 17. This surface being the one at which the anti-skid properties are desired, it is to be noted that the small, hollow frangible particles according to the present invention are evenly distributed throughout the vicinity of this surface. While varying anti-skid properties may be obtained by varying the concentration of the small particles 16 in different parts of the tread portion 14, an anti-skid article suitable for most purposes such as roads for which the ordinary vehicular tire is intended may be formed by thoroughly mixing a given quantity of the particle in uniform distribution throughout the entire rubber-like composition of the tread portion. Since in the tire building process this rubber-like tread portion is formed and handled separately, the entire batch of the rubber-like composition from which tire tread portions are to be made may be loaded with the small particles 16 during the usual milling and extruding stages.

Typical rubber-like tread stocks from which satisfactory anti-skid properties have been obtained according to the present invention are as follows:

1. *Synthetic rubber*

| | Parts by weight |
|---|---|
| GR–S (butadiene-styrene copolymer) | 100 |
| High abrasion furnace black | 50 |
| Softeners | 11 |
| Zinc oxide | 3 |
| Antioxidant | 1 |
| Sulfur | 1.75 |
| Accelerator | .85 |
| Stearic acid | 2.0 |

2. *Natural rubber*

| | Parts by weight |
|---|---|
| No. 3 ribbed smoke sheet | 100 |
| Easy process channel black | 45 |
| Softeners | 5 |
| Zinc oxide | 3 |
| Antioxidant | 1 |
| Stearic acid | 2.5 |
| Sulfur | 2.75 |
| Accelerator | 1 |

Figure 2:
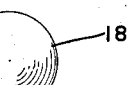
Figure 2 is a perspective of a typical particle to be added to the rubber-like composition of a non-skid rubber article according to the present invention.

To either of the above compositions may be added from about 10 to 100 parts, and preferably 20 to 60 parts by weight (based upon the natural or synthetic rubber-like polymer) of the small refractory particles according to the present invention. A hollow refractory particle found particularly suitable for combination with either of the above rubber compositions is a fused clay particle which is processed in shaft furnaces where the heat causes the argillaceous material to fuse forming a mature ceramic product and at the same time to expand as a result of the expansion of the gases within the clay particle so as to form a substantially spherical hollow ceramic-like particle. Such a particle is shown at 18 in Figure 2. Depending upon the methods and devices by means of which the hot particles are cooled and collected from the shaft furnace and upon mechanical limitations exerted against their expansion, these particles may take a variety of shapes and sizes; but as previously explained, it is important that the surfaces be smooth and rounded so that there will be no abrasive effect upon the rubber-like composition until the hollow particle is broken. Tire recapping compounds commonly known as Camelback, may also be made by forming compounds similar to the above and extruding these in the form of strips of suitable dimensions for use in retreading or recapping of tires.

Figure 3:
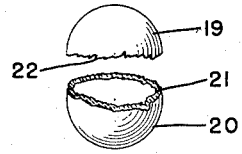
Figure 3 is a perspective of a particle similar to that shown in Figure 2 showing the manner in which the same breaks during use and wear of the article with which it is incorporated.

The fused clay particles described will break upon contact with a rigid surface such as a highway or the like into fragments such as 19 and 20 of Figure 3. About the line of separation 21, there will be formed a plurality of sharp edges 22 which will, as previously explained, impart the desirable skid-resistant properties when this pattern of sharp edges is exposed at the surface of the rubber-like article to the highway or similar surface with which it is in contact.

Figure 4:
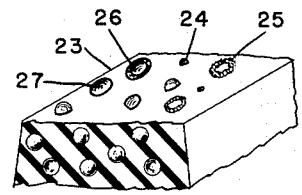
Figure 4 is a perspective of an enlarged rib of a typical tire tread incorporating the features of this invention.

Referring now to Figure 4 and the manner in which these particles become exposed to the road-contacting surface of a vehicular tire, there is shown an enlarged tire rib 23 similar to the ribs 17 in Figure 1. Since the small particles are distributed throughout a considerable depth of the tread portion of the tire, it is to be understood that, as this portion is worn down, an ever changing pattern of particles will be presented to the road-contacting surface. At any particular stage of this wear, that pattern might be such as is represented in Figure 4, wherein a small particle 24 is just beginning to emerge from the rubber-like composition and is as yet unbroken. At 25, the particle with respect to the particular stage of wear has further emerged from the rubber-like composition and has been broken so as to form the previously described sharp, jagged contour. Further wear upon the particle as it becomes more and more exposed by the wear upon the tread composition is represented at 26 where the jagged portion of the particle has been worn almost even with the rubber and finally at 27 where the particles have been further broken or so worn as to fall away from the rubber-like composition of the tread, leaving the desired suction-creating cup or cavity.

Figure 5:
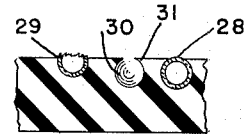
Figure 5 is a further enlarged cross section through a rib of a typical tire tread according to the present invention.

These particular stages of advancement of the small, hollow particles through the road-contacting portion of the tire tread is further illustrated in the greatly enlarged cross section of such a tread in Figure 5. Here the particle 28 just about to break through the road-contacting surface of the tread retains its integrity and spherical shape. Before the particle is exposed to the surface and subsequently broken, it can be seen that the smooth and rounded edges of the particle are such that, as it is acted upon by the forces internally of the rubber-like tread composition, it will cause no deleterious effects upon the same. Once the particle has been sufficiently exposed to the road-contacting surface to be broken as at 29, it can be seen that even though a jagged edge is presented to the road or highway, the smooth rounded portion of the fragment remaining within the rubber composition will still protect the rubber from any damage resulting from the abrasive effect of the particle. The spherical cavity 30 has been left by one of the refractory particles which has been completely broken. Because of the fragile nature of these particles, they will be broken so as to fall away from the rubber composition often before they are more than half way removed therefrom with a result that the dimensions at the opening of the cavity, that is, the opening on the surface-contacting portion of the tread will be less than the internal dimensions of the cavity itself so that a small rubber ring such as at 31 will surround the opening of the cavity on to the surface-contacting portion. This rim 31 being of the thin rubber-like composition will be highly resilient so that it will readily conform to a contiguous surface thereby facilitating an airtight suction forming seal between the cavity and the highway or other surface with which the anti-skid article is in contact. As the particle finally breaks so as to fall away from the rubber article and leave the cavity section 30, it still assists the skid-resistant properties of the article in one last particular insofar as the fragmentary portions of the particle in pulverized and powdered form present a form of abrasive material between the rubber composition and the highway or similar surface contacted by the non-skid article.

Figure 6:
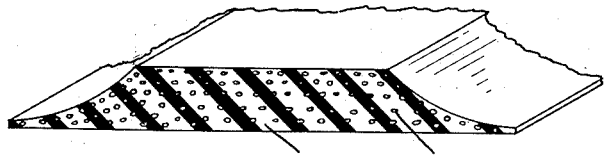
Figure 6 is a view in perspective and partial cross section of a segment of a tire recapping tread material.

A segment of a strip of Camelback or tire recapping material is shown in Figure 6 wherein particles 32 are shown dispersed in rubber compound 33.

Although particular examples and embodiments have been referred to in the foregoing disclosure, it is to be understood that such reference is purely for descriptive purposes and does not limit the scope of the present invention as defined in the following claims.

I claim:

1. A non-skid tread of rubber-like composition for an automotive tire comprising a wearable surface-contacting portion and a plurality of frangible hollow particles interspersed therein such that they will form a changing pattern of small craters and particle fragments on the surface as it is worn away.

2. A non-skid tread of rubber-like composition for an automotive tire comprising a wearable surface-contacting portion and a plurality of frangible hollow particles interspersed therein such that they will form a changing pattern of small craters and particle fragments on the surface as it is worn away, some of said craters having a circular opening on said surface of less diameter than that of the interior of said craters.

3. In a tire, a non-skid tread of rubber-like composition comprising a wearable surface-contacting portion and a plurality of frangible hollow particles interspersed therein such that they will form a changing pattern of small craters and particle fragments on the surface as it is worn away.

References Cited in the file of this patent

UNITED STATES PATENTS

| | | |
|---|---|---|
| 2,569,546 | Treue | Oct. 2, 1951 |
| 2,607,386 | Pavlik | Aug. 19, 1952 |
| 2,676,892 | McLaughlin | Apr. 27, 1954 |

FOREIGN PATENTS

| | | |
|---|---|---|
| 764,663 | France | May 25, 1934 |